(12) United States Patent
Clarke et al.

(10) Patent No.: US 8,744,999 B2
(45) Date of Patent: Jun. 3, 2014

(54) IDENTIFIER COMPRESSION FOR FILE SYNCHRONIZATION VIA SOAP OVER HTTP

(75) Inventors: Simon Peter Clarke, Seattle, WA (US); David Charles Oliver, Bellevue, WA (US); Brent James Van Minnen, Seattle, WA (US); Miko Arnab S Bose, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 19 days.

(21) Appl. No.: 13/556,478

(22) Filed: Jul. 24, 2012

(65) Prior Publication Data

US 2013/0198155 A1 Aug. 1, 2013

Related U.S. Application Data

(60) Provisional application No. 61/592,533, filed on Jan. 30, 2012.

(51) Int. Cl.
*G06F 7/00* (2006.01)

(52) U.S. Cl.
USPC .......................................... 707/625

(58) Field of Classification Search
USPC .......................................... 707/625
See application file for complete search history.

(56) References Cited

U.S. PATENT DOCUMENTS

| 8,078,957 | B2 | 12/2011 | Clarke et al. |
| 2010/0088297 | A1 | 4/2010 | Kiilerich et al. |
| 2010/0274772 | A1 | 10/2010 | Samuels |
| 2011/0035558 | A1 | 2/2011 | Leon et al. |
| 2011/0320469 | A1* | 12/2011 | Canessa et al. ............... 707/758 |

OTHER PUBLICATIONS

"[MS-STWEB]: Windows Live SkyDrive Save to Web SOAP Web Services", Published Date: Jan. 22, 2012, 38 pages. Available at: http://download.microsoft.com/download/1/6/F/16F4E321-AA6B-4FA3-8AD3-E94C895A3C97/[MS-STWEB].pdf.

"[MS-FSSHTTP]: File Synchronization via SOAP over HTTP Protocol Specification", Published Date: Jan. 22, 2012, 136 pages. Available at: http://download.microsoft.com/download/8/5/8/858F2155-D48D-4C68-9205-29460FD7698F/[MS-FSSHTTP].pdf.

Liu, et al. "Adaptive Synchronization Framework for Navigated Hypermedia Document Presentation", In Proceedings of the IEEE International Conference on Multimedia and Expo, vol. 3, Jun. 27, 2004, pp. 2223-2226. Available at: http://ieeexplore.ieee.org/stamp/stamp.jsp?tp=&arnumber=1394712.

Khan, et al. "QoS-based Synchronization of Multimedia Document Streams", In Proceedings of the IEEE Fourth International Symposium on Multimedia Software Engineering, Dec. 11, 2002, pp. 320-327. Available at: http://ieeexplore.ieee.org/stamp/stamp.jsp?tp=&arnumber=1181629.

(Continued)

*Primary Examiner* — Truong Vo
(74) *Attorney, Agent, or Firm* — Steve Crocker; Jim Ross; Micky Minhas (57) ABSTRACT

As changes are made to a document, each change may be assigned an extended identifier comprising a globally unique identifier (GUID) component and an integer component. Upon determining that the same GUID component is used in identifiers for multiple changes, the GUID component may be mapped to a range of indices. Each index of the range of indices may then be used to represent the same GUID component in each extended identifier.

20 Claims, 7 Drawing Sheets

(56) References Cited

OTHER PUBLICATIONS

Okamoto, et al. "An Introduction of Compression Algorithms into SSL/TLS and Proposal of Compression Algorithms Specialized for Application". In Proceedings of the 17th International Conference on Advanced Information Networking and Applications, Mar. 27, 2003, pp. 817-820. Available at: http://ieeexplore.ieee.org/stamp/stamp.jsp? tp=&arnumber=1193007.

\* cited by examiner

IDENTIFIER COMPRESSION FOR FILE SYNCHRONIZATION VIA SOAP OVER HTTP

RELATED APPLICATION

Under provisions of 35 U.S.C. §119(e), the Applicants claim the benefit of U.S. provisional application no. 61/592,533, filed Jan. 30, 2012, which is incorporated herein by reference.

BACKGROUND

File transfer protocols such as the File Synchronization via SOAP over HTTP (MS-FSSHTTP) stateless protocol use identifiers to track and reference objects within files. In most situations, these files contain large numbers of data elements, each of which may have multiple identifiers of their own and references to other objects via those objects' identifiers. These identifiers themselves may often be large, on the order of 20 bytes in the MS-FSSHTTP protocol, so storing and manipulating these identifiers can result in a great deal of overhead.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

As changes are made to a document, each change may be assigned an extended identifier comprising a globally unique identifier (GUID) component and an integer component. Upon determining that the same GUID component is used in identifiers for multiple changes, the GUID component may be mapped to a range of indices. Each index of the range of indices may then be used to represent the same GUID component in each extended identifier.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

In modern work environments, large documents often comprise multiple complex elements. For example, a year-end presentation document may have slides of spreadsheets, pages of text, embedded videos, links to other documents, pictures, graphs, and other objects. Oftentimes, multiple people will work on these documents at the same time. This work results in modifications to the document that must be kept in sync so that each person's version of the document is up-to-date with changes made by the others.

File transfer and synchronization protocols, such as the File Synchronization via SOAP over HTTP protocol (MS-FSSHTTP), may be used to synchronize each person's changes to the other people working on the same document. Documents may be divided into cells that encompass multiple objects. For example, a cell may comprise a single slide of a multi-slide presentation file that in turn comprises several application data objects, such as bullet points of text, graphs, images, etc. Each object may in turn reference other objects in addition to containing application data. For example, a graph may reference underlying data in a spreadsheet object that may be part of another cell of the document.

Each object may be identified using a unique identifier. This allows each change to the object to be tracked separately and synchronized to other copies of the overall document. For example, a data point in a spreadsheet data object may be associated with an extended identifier comprising a globally unique identifier (GUID) and an integer component associated with the change. The GUID may be represented by a 16-byte string of data, such as "5C877884-CB53-433D-A937-6FEF81258B06." In some embodiments consistent with this disclosure, the GUID may comprise essentially random data. The integer component may, for example, be a change counter represented by a 32-bit integer that may start from zero and increment each time an object is changed. The resulting extended identifier for the changed object may then be represented as {5C877884-CB53-433D-A937-6FEF81258B06, 635}.

Such long, 16-byte identifiers consume much more memory than a 32-bit integer, especially as objects reference multiple other objects, so applications may be configured to use indices for the GUID portion instead. For example, multiple objects may use the same GUID as long as the second integer component is different for each object. In such cases, a table may be created mapping a 16 or 32-bit integer index to the GUID. Each object in use by a given application may then use a shorter unique index that maps back to the GUID while changes are being made. The index can then be re-mapped back to the longer GUID when the changes are saved and/or submitted for synchronization with other copies of the document. Once the changes are submitted, at least some of the range of indices may be released, and those indices may be unreserved for re-use and/or future re-allocation.

Figure 1:
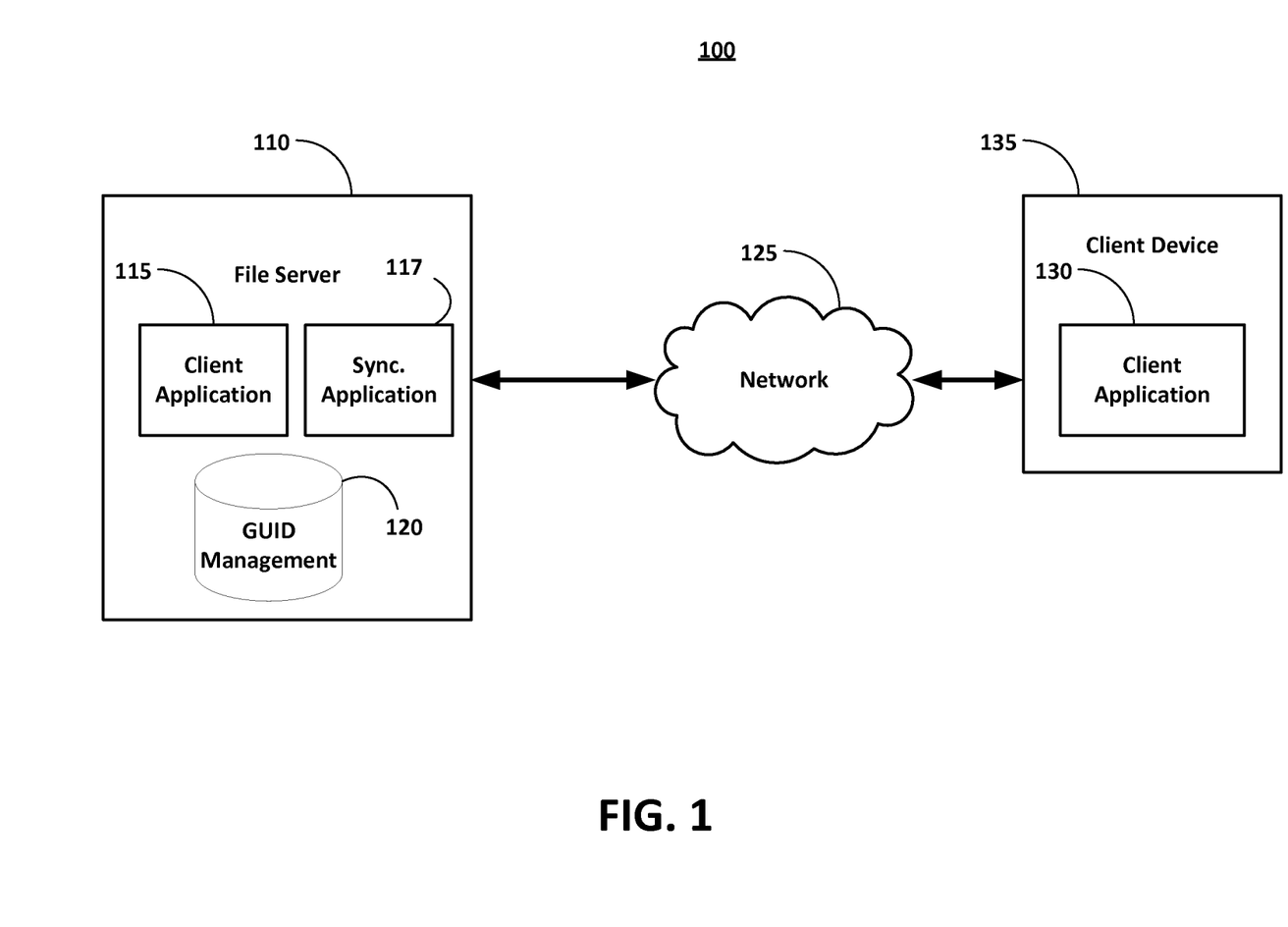
FIG. 1 is a block diagram of an operating environment.

FIG. 1 is a block diagram of an operating environment 100 that may provide identifier compression for a file synchronization protocol. Operating environment 100 may comprise a file server 110 that may execute a first client application 115 and a document synchronization application 117. File server 110 may also provide a global unique identifier (GUID) management database 120. File server 110 may be operable to communicate via a network 125 with a second client application 130 executing on a client device 135. For example, first client application 115 may comprise a document editing application allowing a first user to edit sections of a particular document while second client application 130 also edits the same document. Such edits may be made to the same or different sections, and edits made to the document by each application may be propagated to the other application(s) by document synchronization application 117. In some embodiments consistent with this disclosure, edits to the document may be provided to document synchronization application 117 by first client application 115 and/or second client application 130 as each client saves their copy of the edited document. That is, rather than synchronizing a whole document, only the edits to the document, as individually identified below, may be propagated by the document synchronization application 117.

GUID management database 120 may store tables that map integer indices to GUIDs. The indices may be tracked as unassigned or as assigned to particular clients such as first client application 115 and/or second client application 130. For example, first client application 115 may be assigned an index range of 1-20000 for a given GUID while second application client 130 may be assigned an index range of 20001-40000 for the same GUID.

Figure 2:
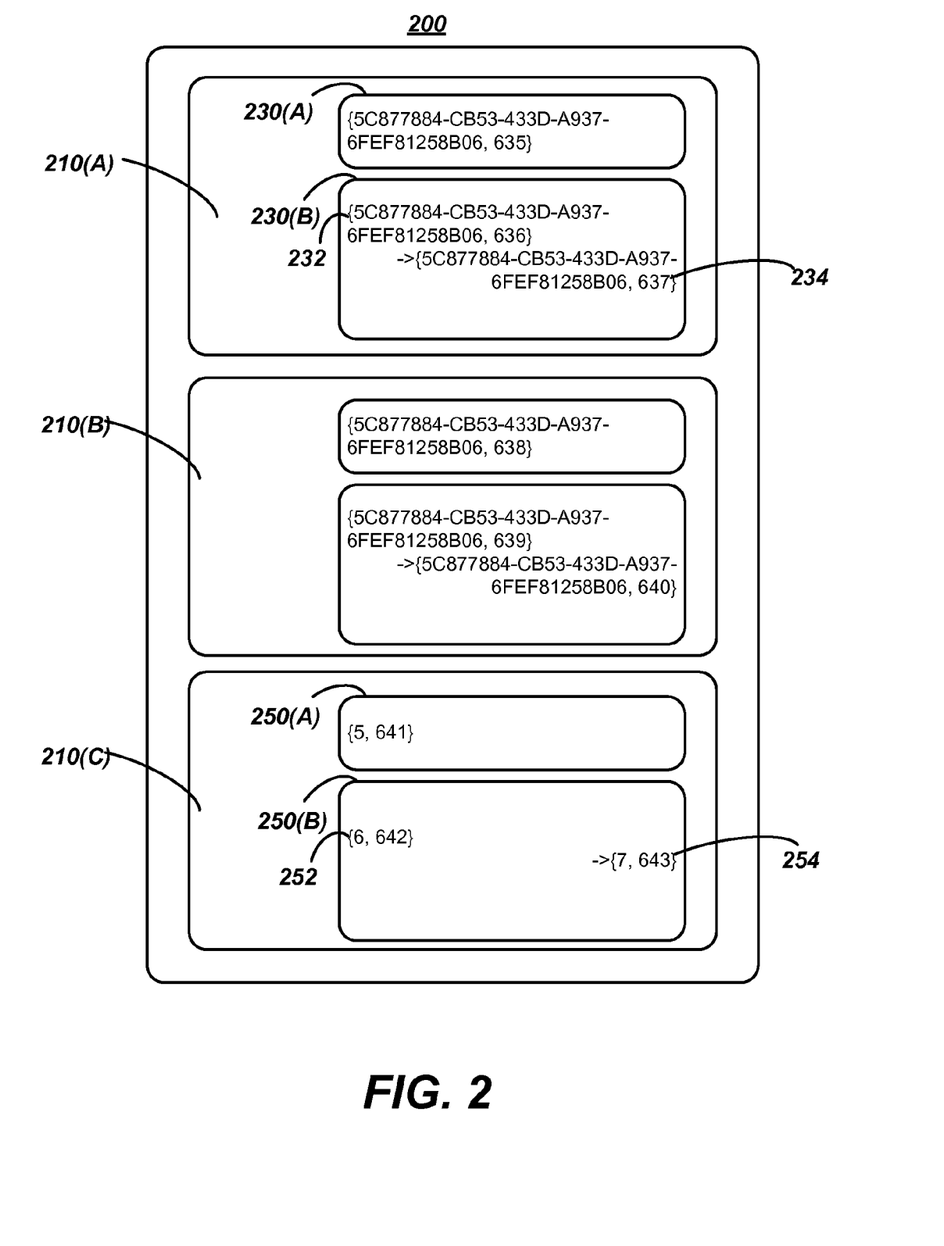
FIG. 2 illustrates an example file structure utilizing aspects of this disclosure.

FIG. 2 illustrates an example file structure utilizing aspects of this disclosure. A document 200 used in a collaboration setting may be divided into multiple sections. Consistent with embodiments of this disclosure, document 200 may be divided into a plurality of cells 210(A)-(C), each of which may encompass a segment of the document. For example, document 200 may comprise a spreadsheet document and each of plurality of cells 210(A)-(C) may encompass a slide within the spreadsheet. Cells 210(A)-(C) may be further subdivided into objects within the cell, such as a first plurality of objects 230(A)-(B) within cell 210(A) and a second plurality of objects 250(A)-(B) in cell 210(C).

Each object within a cell may be assigned an extended identifier comprising a GUID component and an integer component. For example, object 230(B) in cell 210(A) may comprise an extended identifier 232. Extended identifier 232 may comprise a GUID component and an integer component. For example, extended identifier 232 is represented as {5C877884-CB53-433D-A937-6FEF81258B06, 635}, wherein "5C877884-CB53-433D-A937-6FEF81258B06" represents the GUID component and "635" represents the integer component.

Objects may also use these identifiers as references to other objects, such as a reference identifier 234 in cell 210(A). Each object must have a unique extended identifier, whether by its GUID component or its integer component. That is, objects can share the same GUID component as long as each of those objects' integer components are different. When the GUID component is the same, methods for providing identifier compression, as described below, may be used to shorten the extended identifiers. For example, by mapping the GUID of 5C877884-CB53-433D-A937-6FEF81258B06 to a range of indices, a compressed object identifier 252 and a compressed object reference 254 may be used in object 250(B) in cell 210(C).

Figure 3:
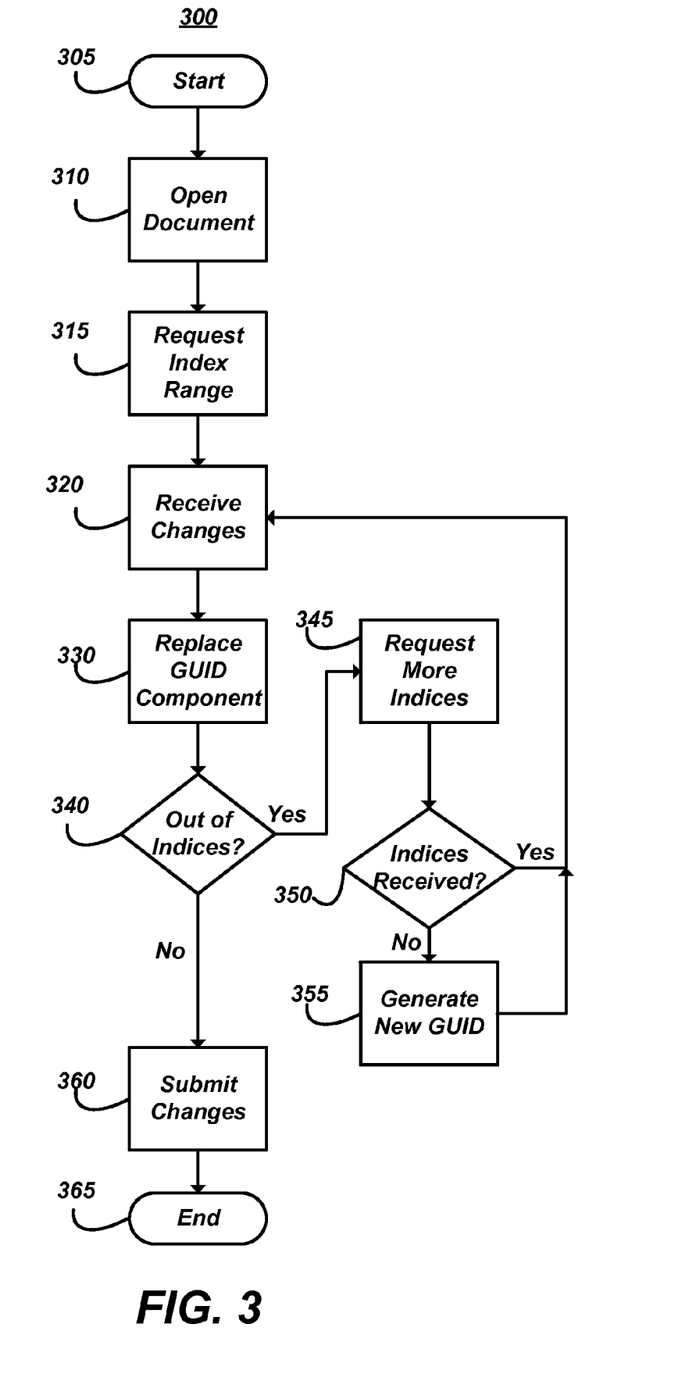
FIG. 3 is a flow chart of a method for providing identifier compression.

FIG. 3 is a flow chart setting forth the general stages involved in a method 300 consistent with an embodiment of the invention for providing identifier compression. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may open a document in an application. For example, first client application 115 may open a collaborative document, such as a spreadsheet, that may be synchronized by document synchronization application 117.

Method 300 may then advance to stage 315 where computing device 400 may request a range of indices from the document synchronization application. For example, client application 115 may request a globally unique identifier (GUID) for changes to be made to the collaborative document from document synchronization application 117. Document synchronization application 117 may allocate a range of indices associated with a GUID comprising, for example, a consecutive range of 100,000 32-bit integers. The association between the range of indices and the GUID may be maintained in GUID management database 120, along with allocation information such as the time the range was allocated and an identifier for the requesting client.

Method 300 may then advance to stage 320 where computing device 400 may receive a plurality of changes to the document. For example, a user may edit various objects within the document. Each changed object may be identified with an extended identifier comprising a GUID component and an integer component. The GUID component may initially comprise a full-length GUID, which may be 16-bytes of data.

Method 300 may then advance to stage 330 where computing device 400 may replace the GUID component in each extended identifier. For example, multiple objects may share the same GUID component so long as the integer component associated with each of those multiple objects is unique. The client application may replace the GUID component in the extended index for each changed object (and/or in the extended index for any references within those objects) with an index from the range of indices. Each index for a given GUID is used only once. By allocating a large range of indices, such as 100,000, all of the objects in use by a given application will be able to use the same GUID without having to store the long-form in each object. Furthermore, to ensure that each index is used only once, a timestamp may be stored alongside the allocation state (i.e., the next integer of the range of indices). Periodically, a check of the current time versus the timestamp may be made to ensure that the current time is always greater (within a range of tolerance) than the timestamp. In the case that the timestamp is greater than the current time, a discrepancy is detected and the range of indices is discarded to prevent reuse of integers. In this case, a second range of indices may be requested from the document synchronization application, as described with respect to stage 315.

Method 300 may then advance to stage 340 where computing device 400 may determine whether each integer of the range of indices has been used. For example, first client application 115 may determine whether enough changes have been made to the document to have used all of the indices (e.g., by using a counter). In some embodiments consistent with this disclosure, indices may be re-used within the client application(s) once the changes are propagated. When the client is offline from the network, however, such changes may not be able to be sent to other client applications.

In response to determining that the range of indices have all been used, method 300 may advance to stage 345 where computing device 400 may request a second range of indices from the document synchronization application. This may occur as described above with respect to stage 315.

Method 300 may then advance to stage 350 where computing device 400 may determine whether a second range of indices has been received. For example, second client application 130 may attempt to request a new range of indices from document synchronization application 117. If client device 135 is disconnected from network 125, however, the request may not be able to be sent nor a reply received.

In response to determining that the second range of indices has not been received from the document synchronization application, method 300 may advance to stage 355 where computing device 400 may identify subsequent changes to the document with a newly generated GUID component. For example, second client application 130 may generate at least one new 16-byte GUID, and use that as the GUID component in subsequent extended identifiers. If the new range of indices is received at stage 350, or once a new GUID is generated at stage 355, method 300 may return to stage 320 to continue receiving changes and identifying them with the new index range.

After determining that indices remain available at stage 340, method 300 may advance to stage 360 where computing device 400 may submit the plurality of changes to the document synchronization application. For example, second client application may submit a list of changes to various objects within the document to document synchronization application 117, where each object is identified by the extended identifier comprising the GUID index instead of the longer GUID component. Document synchronization application 117 may be operative to translate the GUID index back into the GUID component before propagating the changes to other copies of the document, such as may be open on first client application 115. Method 300 may then end at stage 365.

An embodiment consistent with the invention may comprise a system for providing identifier compression. The system may comprise a memory storage and a processing unit coupled to the memory storage. The processing unit may be operative to create a new document in an application, receive a plurality of changes to the document, assign an extended identifier to each of the plurality of changes, wherein the extended identifier comprises a globally unique identifier (GUID) component and an integer component, and determine whether at least one first extended identifier and at least one second identifier each comprise a same (GUID) component. In response to determining that the at least one first extended identifier and the at least one second identifier each comprise the same (GUID) component, the processing unit may be further operative to map the same GUID component to a range of indices, assign at least one first index of the range of indices to represent the same GUID component in the first extended identifier, and assign at least one second index of the range of indices to represent the same GUID component in the second extended identifier.

Another embodiment consistent with the invention may comprise a system for providing identifier compression. The system may comprise a memory storage and a processing unit coupled to the memory storage. The processing unit may be operative to receive a request from an application for at least one globally unique identifier (GUID) associated with change tracking in a document, allocate a range of indices associated with the at least one GUID, provide the range of indices associated with the at least one GUID to the application, receive at least one change to an object associated with the document from the application, wherein the at least one change is associated with an extended identifier comprising at least one index of the range of indices, translate the at least one index of the range of indices into the at least one GUID in the extended identifier, and propagate the at least one change to the at least one object associated with the document to at least one other copy of the document.

Yet another embodiment consistent with the invention may comprise a system for providing identifier compression. The system may comprise a memory storage and a processing unit coupled to the memory storage. The processing unit may be operative to open a document in an application, wherein the document comprises a collaboration document synchronized by a document synchronization application, request a range of indices from the document synchronization application, wherein the range of indices comprises a consecutive range of 100,000 32-bit integers and wherein each index of the range of indices is associated with a globally unique identifier (GUID) comprising a 16-byte string of data, receive a plurality of changes to the document, wherein each of the plurality of changes is associated with an object in the document identified by an extended identifier comprising a GUID component and an integer component, replace the GUID component in each extended identifier associated with each of the plurality of changes with an index of the range of indices, and determine whether the range of indices have all been used. The processing unit may be further operative to, in response to determining that the range of indices have all been used, request a second range of indices from the document synchronization application, determine whether a second range of indices has been received from the document synchronization application, and, if not, identify subsequent changes to the document with a newly generated GUID component. The processing unit may also be operative to submit the plurality of changes to the documents synchronization application.

Figure 4:
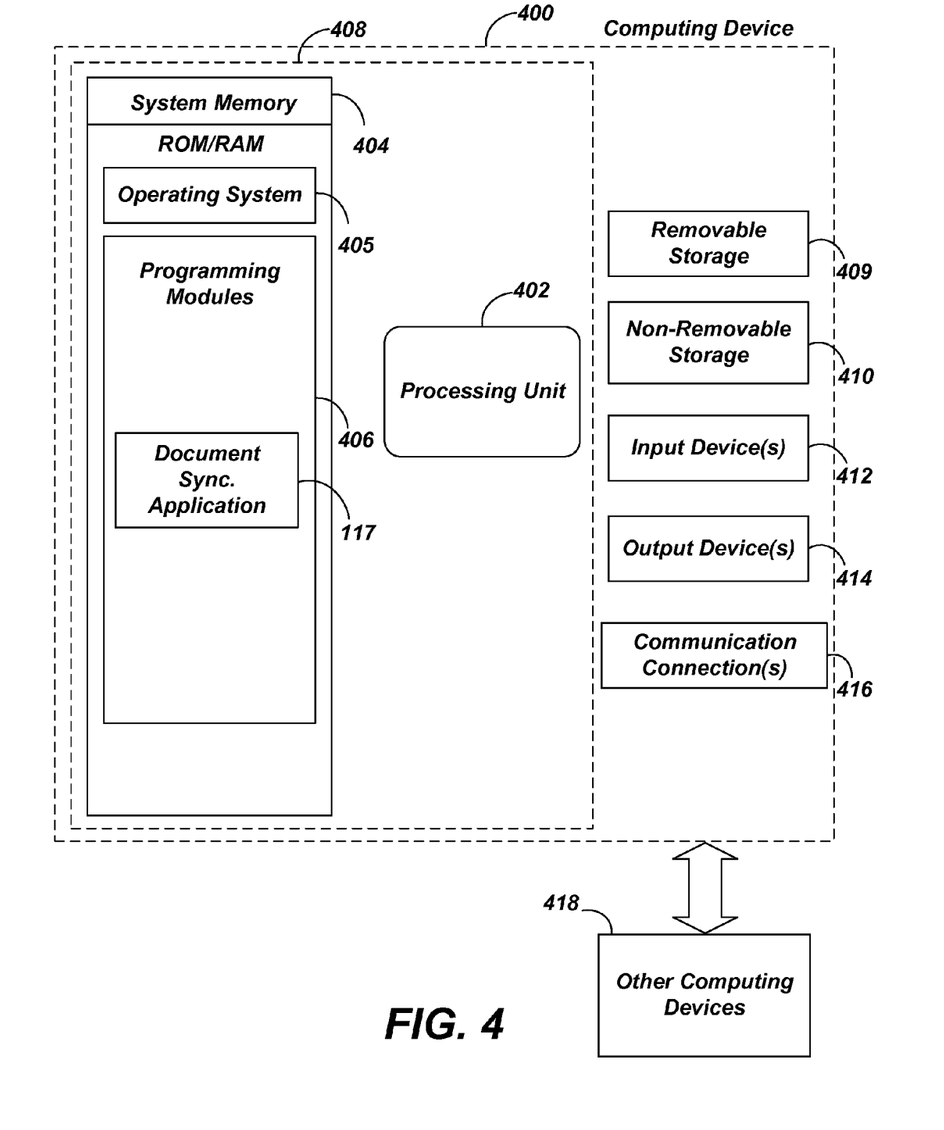
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Methods described in this specification may operate in other environments and are not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may comprise document synchronization application 117. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
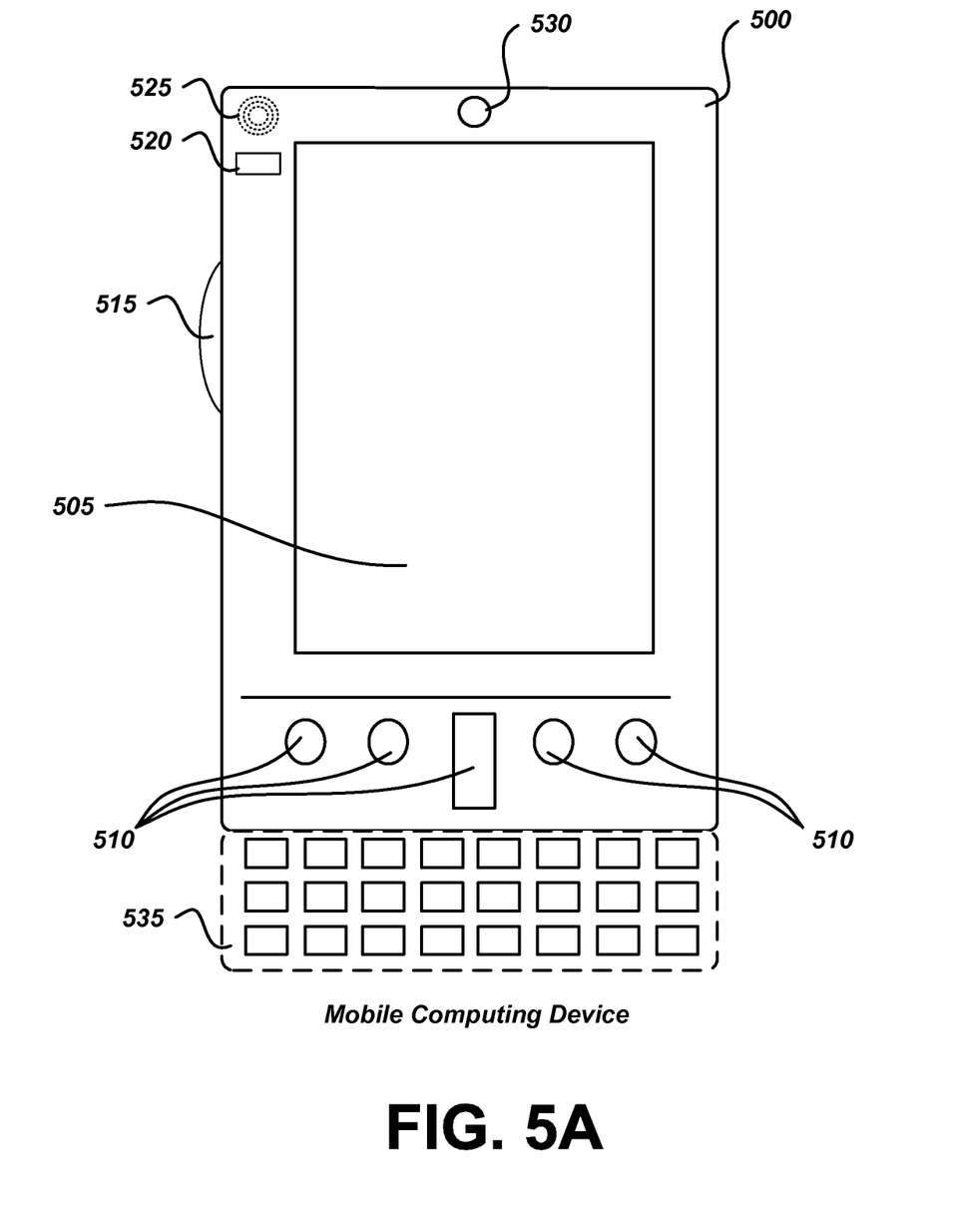
FIGS. 5A-5B are simplified block diagrams of a mobile computing device with which embodiments of the present disclosure may be practiced.
Figure 5B:
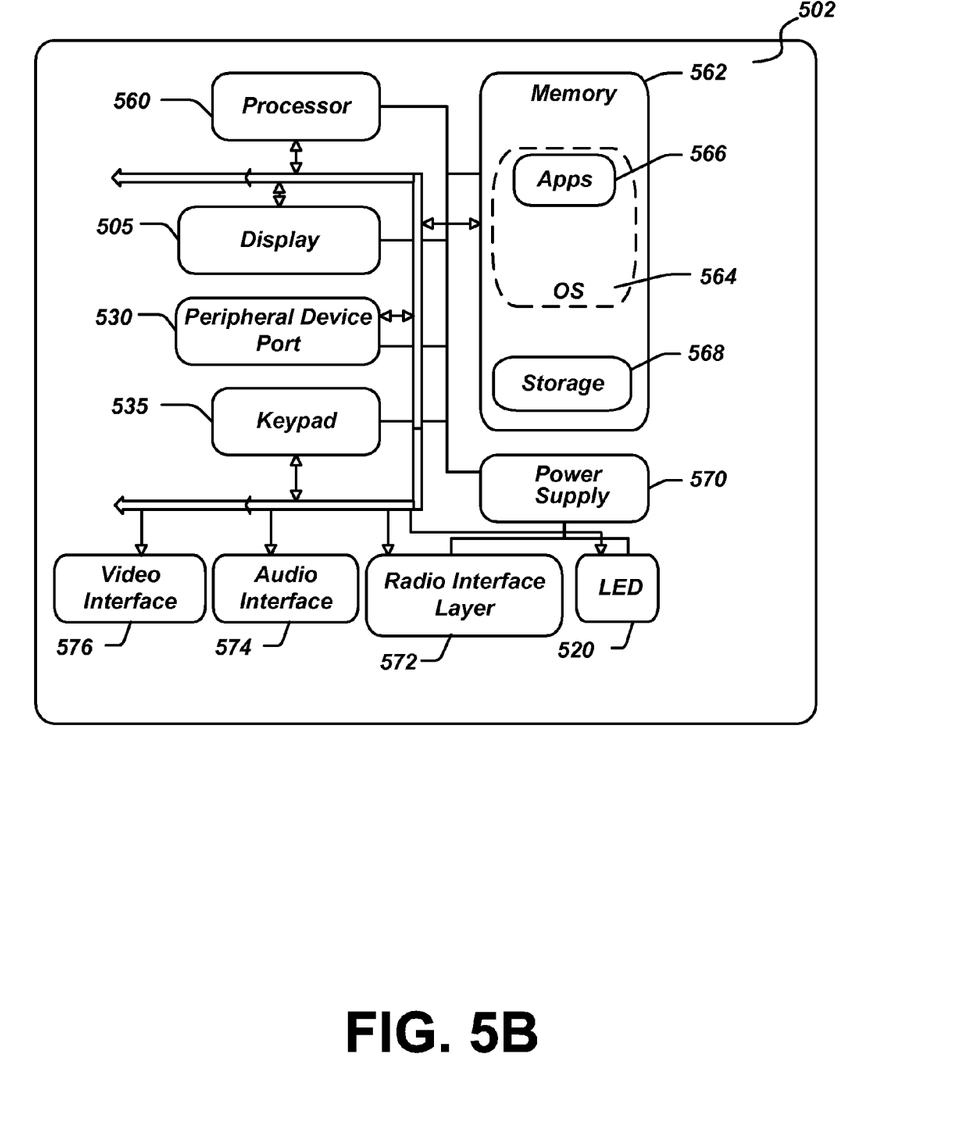

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
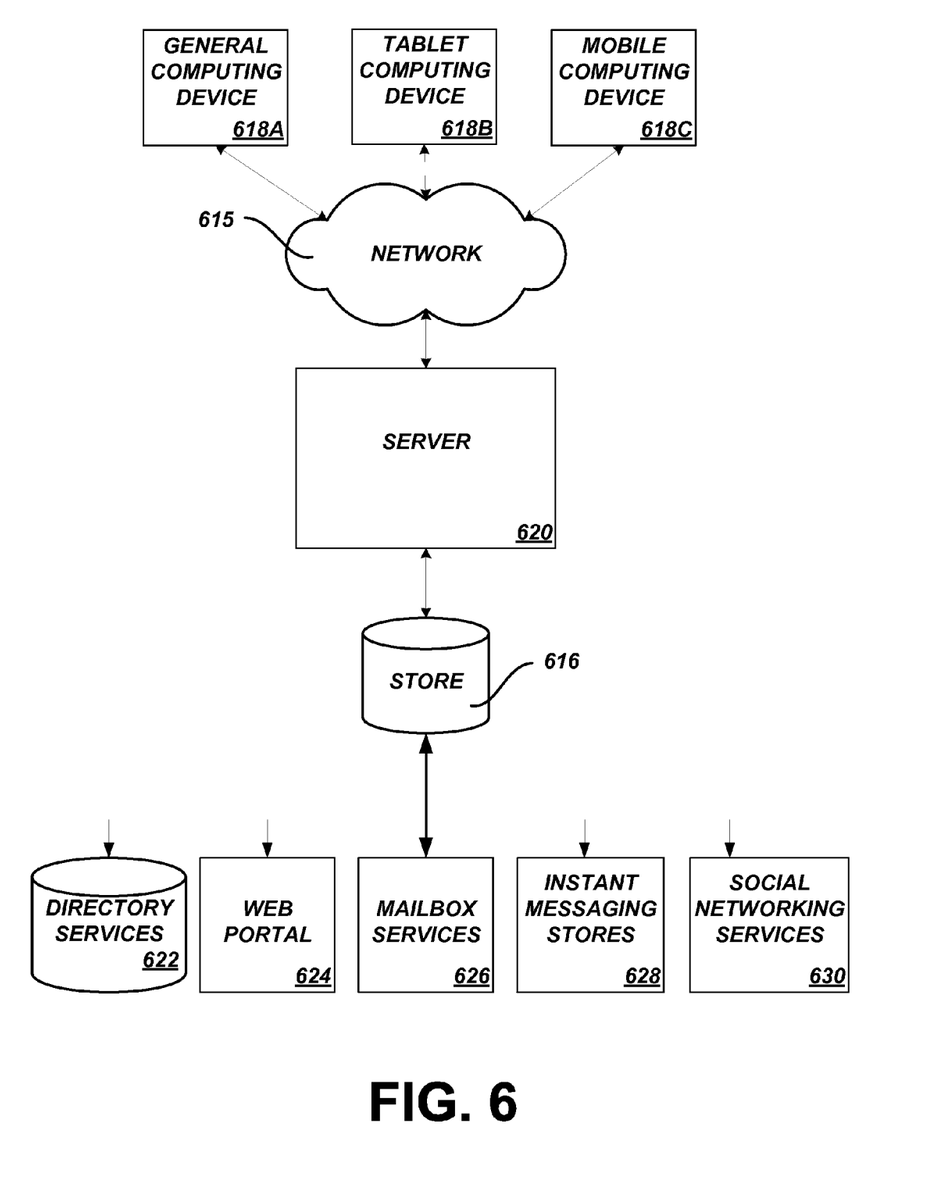
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618a, a tablet computing device 618b and/or a mobile computing device 618c (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing identifier compression, the method comprising:
   creating a new document in an application;
   receiving a plurality of changes to the document;
   assigning an extended identifier to at least a first change and a second change of the plurality of changes, wherein the extended identifier comprises a globally unique identifier (GUID) component and an integer component;
   determining whether at least one first extended identifier assigned to the first change and at least one second extended identifier assigned to the second change each comprise a same (GUID) component; and
   in response to determining that the at least one first extended identifier and the at least one second extended identifier each comprise the same (GUID) component:
      mapping the same GUID component to a range of indices,
      assigning a first index of the range of indices to represent the same GUID component in the first extended identifier,
      replacing the same GUID component in the first extended identifier with the first index,
      assigning a second index of the range of indices to represent the same GUID component in the second extended identifier, and
      replacing the same GUID component in the second extended identifier with the second index.

2. The method of claim 1, wherein the integer component of the extended identifier comprises a change counter.

3. The method of claim 1, further comprising requesting at least one assigned GUID component from a document synchronization application.

4. The method of claim 3, further comprising, in response to requesting the at least one assigned GUID component from the document synchronization application, receiving the range of indices to map to the at least one assigned GUID component.

5. The method of claim 4, further comprising:
   determining whether each index of the range of indices has been assigned; and
   in response to determining that each index of the range of indices has been assigned, requesting at least one second assigned GUID component from the document synchronization application.

6. The method of claim 5, further comprising receiving a second range of indices from the document synchronization application.

7. The method of claim 6, wherein the second range of indices are associated with the at least one assigned GUID component.

8. The method of claim 6, wherein the second range of indices are associated with the at least one second assigned GUID component.

9. The method of claim 5, further comprising:
   determining whether the second range of indices was received from the document synchronization application; and
   in response to determining that the second range of indices was not received from the document synchronization application, generating a new GUID component for at least one of the plurality of changes to the document.

10. The method of claim 3, further comprising:
    submitting the plurality of change to the document to the document synchronization application, wherein each of the plurality of changes comprises the extended identifier comprising one index of the range of indices as the GUID component.

11. A system for providing identifier compression, the system comprising:
    a memory storage; and
    a processing unit coupled to the memory storage, wherein the processing unit is operable to:
    receive a request from an application for at least one globally unique identifier (GUID) associated with change tracking in a document,
    allocate a range of indices associated with the at least one GUID,
    provide the range of indices associated with the at least one GUID to the application,
    receive at least one change to an object associated with the document from the application, wherein the at least one change is identified by an extended identifier comprising at least one index of the range of indices and not the at least one GUID,
    translate the at least one index of the range of indices into the at least one GUID, and
    propagate the at least one change to the at least one object associated with the document to at least one other copy of the document.

12. The system of claim 11, wherein the processing unit is further operable to:
    allocate a second range of indices associated with the at least one GUID for at least one second application.

13. The system of claim 11, wherein the processing unit is further operable to:
    receive a release of at least some of the range of indices from the application; and
    unreserve the at least some of the range of indices associated with the at least one GUID for future allocation.

14. The system of claim 11, wherein the processing unit is further operable to:
    update a state variable each time a request for a GUID is received from one of a plurality of applications; and
    update a corresponding state variable associated with a database table operative to map the range of indices to the at least one GUID.

15. The system of claim 14, wherein the processing unit is further operable to:
    detect a discrepancy between the state variable and the corresponding state variable;
    generate a new GUID and a corresponding set of indices; and
    insert the new GUID and the corresponding set of indices into the database table.

16. The system of claim 11, wherein each index of the range of indices comprises a 32-bit integer.

17. The system of claim 11, wherein the range of indices comprises 100,000 indices.

18. The system of claim 11, wherein the processing unit is further operative to:
    receive at least one second change to a second object associated with the document from the application, wherein the at least one second change is associated with an extended identifier comprising an index not within the range of indices; and
    return an error to the application.

19. The system of claim 11, wherein the processing unit is further operative to:
    receive a plurality of changes to the document from a second application, wherein each change of the plurality of changes comprises an application-defined extended identifier comprising an application-defined GUID index;
    receive a mapping table from the application comprising a relationship between the application-defined GUID index and an application-generated GUID component;
    translate the application-defined GUID index into the application-generated GUID component in the extended identifier; and
    propagate the plurality of changes to the document to the at least one other copy of the document.

20. A computer-readable storage device which stores a set of instructions which when executed performs a method for providing identifier compression, the method executed by the set of instructions comprising:
    opening a document in an application, wherein the document comprises a collaboration document synchronized by a document synchronization application;
    requesting a range of indices from the document synchronization application, wherein the range of indices comprises a consecutive range of 100,000 32-bit integers and wherein each index of the range of indices is associated with a globally unique identifier (GUID) comprising a 16-byte string of data;
    receiving a plurality of changes to the document, wherein each of the plurality of changes is associated with an object in the document identified by an extended identifier comprising a GUID component and an integer component;
    replacing the GUID component in each extended identifier associated with each of the plurality of changes with an index of the range of indices;
    determining whether the range of indices have all been used;
    in response to determining that the range of indices have all been used:
    requesting a second range of indices from the document synchronization application,
    determining whether a second range of indices has been received from the document synchronization application, and
    in response to determining that the second range of indices has not been received from the document synchronization application, identifying subsequent changes to the document with a newly generated GUID component; and submitting the plurality of changes to the document synchronization application.

* * * * *